United States Patent
Pimputkar et al.

(10) Patent No.: US 8,453,472 B2
(45) Date of Patent: Jun. 4, 2013

(54) RAPID CHILLING APPARATUS FOR BEVERAGES AND METHOD FOR CONTROLLING THE SAME

(75) Inventors: Girish Pimputkar, Stockholm (SE); Andrei Uhov, St. Petersburg (RU); Roberto Giordano, Pozzuolo Del Friuli (IT)

(73) Assignee: Electrolux Home Products Corporation N.V., Zaventem (BE)

( * ) Notice: Subject to any disclaimer, the term of this patent is extended or adjusted under 35 U.S.C. 154(b) by 288 days.

(21) Appl. No.: 12/093,007

(22) PCT Filed: Jan. 29, 2007

(86) PCT No.: PCT/EP2007/050832
§ 371 (c)(1),
(2), (4) Date: Sep. 16, 2008

(87) PCT Pub. No.: WO2007/088153
PCT Pub. Date: Aug. 9, 2007

(65) Prior Publication Data
US 2009/0139247 A1    Jun. 4, 2009

(30) Foreign Application Priority Data

Jan. 31, 2006   (EP) .................................... 06101054

(51) Int. Cl.
*F25B 49/00*    (2006.01)
(52) U.S. Cl.
USPC .................................. 62/126; 62/157; 62/231
(58) Field of Classification Search
USPC ........................................... 62/126, 157, 231
See application file for complete search history.

(56) References Cited

U.S. PATENT DOCUMENTS 4,358,932 A * 11/1982 Helfrich, Jr. .................... 62/126
5,168,714 A    12/1992 Farber et al.
(Continued)

FOREIGN PATENT DOCUMENTS

JP    2026000    1/1990
JP    4171596    6/1992
(Continued)

OTHER PUBLICATIONS

Namco. "Capacitive Sensor Applications." Namcocontrols.com. Namco Controls, Jul. 24, 2005. Web. May 10, 2011. <http://www.namcocontrols.com/Documents/capacitive_ref-102103.pdf>.*

*Primary Examiner* — Cheryl J Tyler
*Assistant Examiner* — Jonathan Bradford
(74) *Attorney, Agent, or Firm* — Pearne & Gordon LLP

(57) ABSTRACT

Rapid chilling apparatus for beverages including a receptacle (2) accommodating beverage containers (3) of differing length, and cooling structure cooling said receptacle (2), wherein said receptacle (2) includes a plurality of electrodes (4), an inner surface (5) supporting a container (3) such that the electrodes (4) turn out as being distributed along the whole length of the container (3), the electrodes (4) being connected to circuit structure (6) detecting and measuring the capacitance value on each electrode (4) due to the presence of a container (3) made of a conductive or non-conductive material in proximity of the same electrode (4) so as to determine the actual length of the container (3), control structure (7) operating said cooling structure in response to the capacitance values detected by said circuit structure (6) for a period of time, the duration depending on the so determined length of the container (3).

16 Claims, 6 Drawing Sheets

U.S. PATENT DOCUMENTS

| | | | |
|---|---|---|---|
| 5,406,843 A * | 4/1995 | Hannan et al. | 73/304 C |
| 6,474,093 B1 * | 11/2002 | Fink et al. | 62/434 |
| 6,823,730 B2 * | 11/2004 | Buck et al. | 73/304 C |
| 2007/0101734 A1 * | 5/2007 | Lucas | 62/62 |
| 2007/0107786 A1 * | 5/2007 | Schmitz et al. | 137/558 |

FOREIGN PATENT DOCUMENTS

| | | |
|---|---|---|
| JP | 7091797 | 4/1995 |
| JP | 2001174122 | 6/2001 |
| JP | 2002081848 | 3/2002 |

* cited by examiner

RAPID CHILLING APPARATUS FOR BEVERAGES AND METHOD FOR CONTROLLING THE SAME

The present invention refers to a rapid chilling apparatus for beverages, as well as to a method for controlling the same apparatus.

Known in the art, such as for instance from the disclosure in U.S. Pat. No. 4,368,622, there are devices of the above-noted kind for rapidly chilling beverages, which are provided in the form of units integrated in refrigerators.

In other words, inside a refrigerator there is provided a compartment that—as cooled down by a flow of cold air coming directly from the evaporator region of the refrigerator—is arranged to accommodate beverage containers due to be chilled in as short a time as possible.

To such purpose, the user sets a specially provided timer on a proper value for the desired beverage chilling time, during which the cooling air is delivered to the compartment and conveyed therethrough.

It is an object of the present invention to provide a rapid chilling arrangement for beverages, which is capable of automatically detecting when a beverage container to be chilled is introduced in the arrangement, determining the actual size of the same container, and solely starting a rapid chilling cycle when and if such container is introduced in the arrangement, while automatically setting the duration of the chilling cycle in accordance with the size of the container lying in the arrangement.

Within such general object, it is a purpose of the present invention to provide an arrangement that is adapted to identify whether the container is made of a conductive material or a non-conductive material, as for example in the case of a can or a bottle, respectively, while setting the duration of the resulting chilling cycle also in accordance with the so identified type of container.

Another purpose of the present invention is to provide a rapid chilling arrangement of this kind that is simple in construction and reliable in use and operation, as well as capable of being manufactured at competitive costs.

Yet another purpose of the present invention is to provide an arrangement of the above-noted kind, which ensures the greatest possible extent of safety and reliability.

According to the present invention, these aims, along with further ones that will become apparent from the following disclosure, are reached in an arrangement incorporating the features as defined and recited in the claims appended hereto.

According to the present invention, these aims are further reached in a method incorporating the features as defined and recited in the claims appended hereto.

Features and advantages of the present invention will anyway be more readily understood from the description of a preferred, although not sole embodiment thereof that is given below way of non-limiting example with reference to the accompanying drawings, in which.

Figure 1:
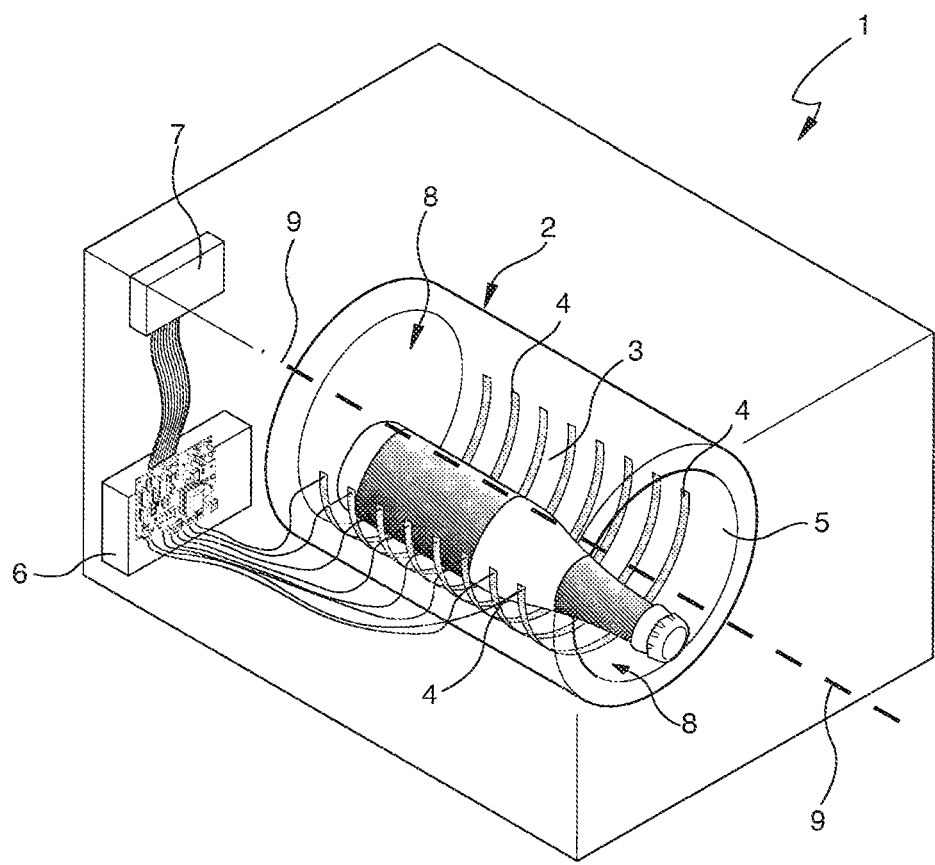
FIG. 1 is a perspective view of a rapid chilling apparatus for beverages according to the present invention.

With reference to the above-cited Figures, the rapid chilling apparatus for beverages according to the present invention—as indicated generally at 1 in said Figures—comprises a receptacle 2 adapted to accommodate beverage containers 3 of differing length, such as bottles, cans an carton-like beverage packages, as well as cooling means adapted to cool down said receptacle 2.

The receptacle itself comprises a plurality of electrodes 4 associated to an inner surface 5 of the receptacle 2 and arranged in succession one after the other along such surface 5.

The inner surface 5 is in turn adapted to support a container 3 in such manner that the electrodes 4 turn out as being distributed around the container 3 along the whole length of the same container.

The electrodes 4 are connected to circuit means 6 adapted to detect and measure the capacitance value on each electrode 4 as this is generated by the presence of a container 3 of a conductive material in proximity of the same electrode 4, so as to determine the actual length of the container introduced in the receptacle, or—in the case of a container 3 of a non-conductive material—as generated by the presence, inside the container, of beverage liquid in proximity of the same electrode 4, so as to determine the actual length of the container 3 being wetted by the beverage liquid contained thereinside In the case of a container 3 of a non-conductive material, it is in fact the beverage liquid being in contact with the inner wall of the container that determines the capacitance value detected and measured on the electrode 4, in the proximity of which such liquid is present.

The circuit means are further adapted to compare these detected capacitance values with pre-defined values in order to discriminate between containers of a conductive and a non-conductive material.

Control means 7 are connected to the circuit means 6 to automatically operate the cooling means for a period of time, the duration of which is made dependant on the so determined length of the container 3 introduced in the receptacle 2, as well as on the material which the container is made of.

The receptacle 2 is comprised of a body provided with a cavity 8 that extends along an axial direction 9 and is adapted to accommodate a beverage container 3. In particular, the receptacle 2 is sized so as to be able to accommodate a bottle, a can or a. beverage carton of different sizes, such as for instance a 0.25-liter, 0.33-liter, 0.5-liter, 0.75-liter, 1-liter and 1.5-liter bottle or can.

The electrodes 4 are provided so as to lie on at least a portion of the inner surface 5 that defines the cavity 8 of the receptacle 2, and are arranged in succession one after the other along such portion in a direction that is parallel to the axial direction 9 of the cavity 8.

Preferably, the portion of inner surface 5 of the cavity 8, on which the electrodes 4 are arranged, is concave.

Furthermore, each electrode 4 is preferably provided in the form of a thin plate of an electrically conductive material, which is bent so as to form an annular member adapted to be associated to the concave portion of the inner surface 5 of the receptacle 2.

The concave shape of at least a portion of the inner surface 5 of the cavity 8 of the receptacle 2, and the corresponding annular conformation of the electrodes 4, practically ensure that there is just a minimum distance separating the side wall of the container from the electrodes 4 in view of ensuring a greater detection accuracy and sensitivity.

Preferably, the receptacle 2 comprises a cylindrical hollow body.

It will be readily appreciated that the receptacle 2 may anyway be provided in a number of different shapes and, in particular, it may have an elliptic, square or even polygonal cross-section and each electrode 4 can be provided in the form of a flat conductive element.

The electrodes 4 may be associated to the receptacle 2 in a manner as to cover, i.e. lie on the inner surface 5 of the latter; in this case, they are in turn covered with a thin isolating layer adapted to prevent the electrodes 4 from being able to come into contact with water, moisture and liquids in general, which would of course affect the accuracy of the capacitance measurements made on the same electrodes.

In an alternative embodiment of the present invention, the electrodes 4 are integrated or embedded within the thickness of the wall of the receptacle, so as to turn out as being positioned in proximity of the inner surface 5 of the receptacle 2, below this surface. Such arrangement ensures that the electrodes 4 are effectively insulated, while at the same time keeping the detection sensitivity on the same electrodes 4 at an adequately high level.

The electrodes 4 are associated to the inner surface 5 of the receptacle 2 and arranged in succession one after the other along a direction that is parallel to the axial direction 9 of the cavity 8 of the receptacle 2.

Figure 2:
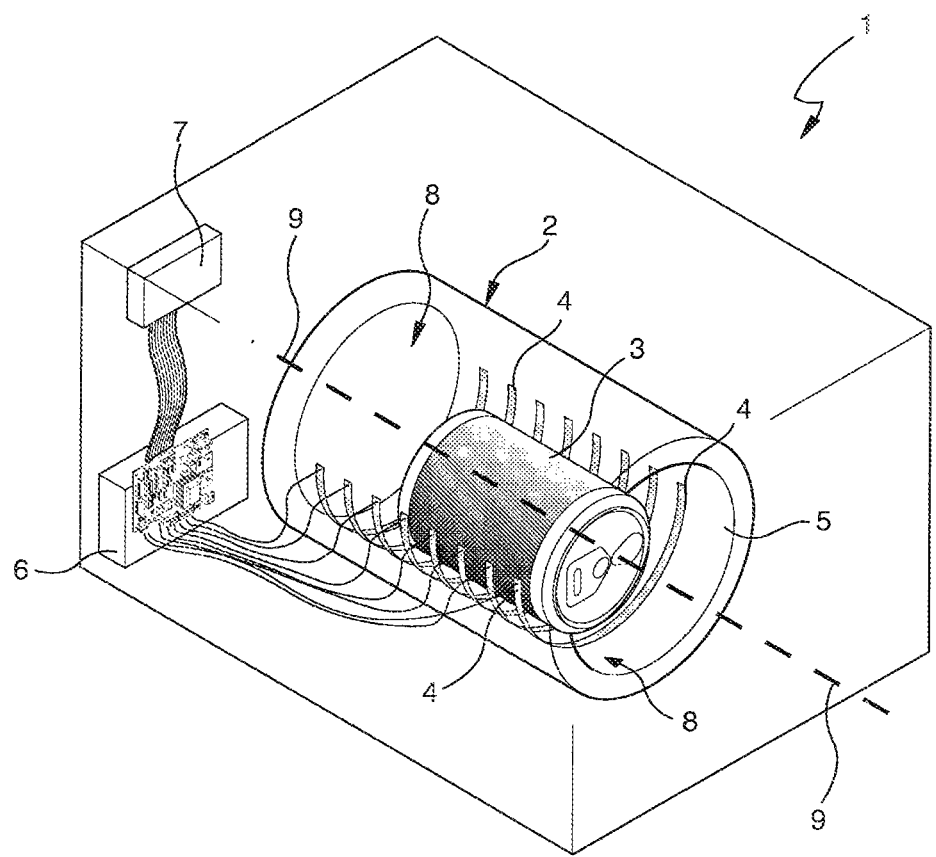
FIG. 2 is a view similar to the one appearing in FIG. 1.

In practice, when the container 3 is placed in position inside the receptacle 2 on the inner surface 5 thereof, the electrodes 4 turn out as being distributed around the side wall of the same container over the entire length thereof, as this is best shown in FIGS. 1 and 2.

When it is placed in position for chilling, the container 3 turns therefore out as resting onto the inner surface 5 of the receptacle 2, with the electrodes 4 lying quite close to the same container 3, as solely separated from the side wall of the latter by the thin insulating layer therebetween.

The electrodes 4 are spaced from each other along the inner surface 5 in the axial direction 9 of the cavity 8 and, preferably, the distance between the electrodes 4 is appropriately selected so as to ensure that both the position and the number of the electrodes 4 can be correlated with the typical lengths of the bottles and cans and beverage cartons that are commonly to be found on the market, which usually contain standard beverage volumes, such as 0.25, 0.33, 0.5, 0.75, 1.0 and 1.5 liters.

Preferably, for an effective contact to be ensured between the container 3 and the inner surface 5 of the receptacle 2 and, as a result, for a minimum distance to be ensured between the electrodes 4 and the side wall of the container 3, the receptacle 2 is arranged in an inclined position, i.e. is given a certain inclination relative to the vertical direction; in other words, the axial direction 9, in which the cavity 8 extends, forms an angle with the vertical.

However, the inner surface 5 supporting the container 3 may be arranged and oriented both horizontally and vertically The electrodes 4 are connected to circuit means 6 that are adapted to detect and measure the capacitance value on the electrodes 4 as this is brought about, i.e. generated by the conductive material, which the container 3 being introduced in the receptacle 2 is made of, or—in the case of a container made of a non-conductive material—by the beverage liquid wetting the inner wall of such container introduced in the receptacle 2 for rapid cooling.

Such circuit means may for instance include an oscillatory circuit or a voltage divider, although—as those skilled in the art will readily be capable of appreciating—use can be made in this connection of other types of circuits that are generally known as such in the art.

In a first embodiment of the present invention, the circuit means 6 are adapted to detect and measure the capacitance value on each single electrode 4.

In a second embodiment of the present invention, the circuit means 6 are arranged so as to activate a single electrode 4 at a time, while grounding the remaining ones or the remaining ones being connected to a reference potential or not being connected at all; in this way, they eventually activate all electrodes in a sequence, as this is best shown schematically in FIGS. 1 and 2. Then, the circuit means measure the capacitance value between the measurement electrode being activated each time and the other electrodes that are on the contrary grounded. In this way, a capacitance value on each electrode 4 is obtained.

In a third embodiment of the present invention there is provided a plurality of electrode pairs, of which one electrode is the measurement electrode and the other electrode is the grounded one. Then, the circuit means 6 measure the value of and the variation in capacitance between each pair of electrodes.

When the receptacle 2 is empty, i.e. no container has been placed there for rapid cooling, the capacitance value measured on each electrode 4 is due to only air being the actual dielectric material.

In the case that a beverage container 3 made of a non-conductive material, such as a glass or plastic bottle, or a carton-like beverage package of some kind, is introduced in the cavity 8 of the receptacle 2, the capacitance value that is detected on the electrodes 4 lying close to the side wall of the container changes in accordance with, i.e. depending on beverage liquid being or not being present in proximity of each such electrode.

As a matter of fact, the beverage liquid has a higher electric conductivity than air and even glass, plastic or cardboard, i.e. the non-conductive materials, which beverage containers currently available on the market are commonly made of.

A number of experimental tests carried out in this connection have demonstrated that the sole presence of a container of a non-conductive material in an empty state thereof, i.e. not containing any liquid, inside the receptacle 2, does not bring about any significant variation in the capacitance value measured on the electrodes as compared with the value measured on the same electrodes when no container 3 is present in said receptacle 2.

In practice, the capacitance value being detected on the electrodes when a container 3 of non-conductive material is placed in its empty state, i.e. without any liquid being contained therein, on the inner surface 5 of the receptacle 2, is substantially equal to the capacitance value measured on the same electrodes 4 when the receptacle 2 itself is empty, i.e. no container is placed therein, so that said capacitance value is solely due to air acting as the actual dielectric.

On the other hand, when a container 3 of a non-conductive material, but containing liquid is placed upon the inner surface 5 of the receptacle 2, the electrodes that lie close to the side wall of the container 3 being wetted or covered internally by the amount of beverage liquid contained therein, i.e. close to the side wall of the container 3, the inner surface of which is in contact of the beverage liquid contained in the same container, deliver a capacitance value that is higher than the one that can be detected and measured on the electrodes 4 facing portions of the side wall of the container 3 that are on the contrary not wetted by any beverage liquid.

As described hereinbefore, and also based on what has been found experimentally, the capacitance value measured on the electrodes 4 lying in the zone in which the inner surface 5 is in contact with the portion of side wall of the container 3 that is not wetted by the beverage liquid contained therein, turns out as being substantially equal or quite similar to the value that is typically detected when solely air is present as a dielectric in the receptacle 2, i.e. when such receptacle is empty.

The capacitance value measured on each electrode 4 is greater in the situation in which the side wall of the container 3 being wetted by the beverage liquid is in contact with the whole area of the inner surface 5 of the cavity 8 where an electrode 4 lies. Conversely, in those situations in which the side wall of the container 3 being wetted by the beverage liquid comes only partially in contact, or does not come into any contact at all, with the area of the inner surface 5 lying above an electrode 4, the capacitance value detected on such electrode will be considerably lower and substantially comparable to the one brought about by only air being the actual dielectric in the receptacle, i.e. when the latter is empty, or by the same electrode lying in a zone in which the inner surface 5 of the cavity 8 is in contact with the side wall of the container 3, but such side wall of the container 3 is not wetted by any beverage liquid.

Low capacitance values may also indicate those electrodes 4 that come to lie close to narrower or recessed portions of the container 3, or tapering portions that do not come into contact with the inner surface 5 of the cavity 8, as these may in particular be quite frequently found in bottles currently available on the market.

The control means 7 are adapted to compare the capacitance values measured on each electrode 4 with a first predetermined threshold capacitance value representing a length reference level, i.e. a level indicative of length, which is used to discriminate whether the electrode is delivering a valid length signal for the container 3 or it does not deliver any length signal at all.

Experimental tests have shown that an adequate value for the above-cited first threshold capacitance value is represented by the capacitance value due to only air being present in the receptacle 2, i.e. due to such receptacle being empty, as increased by a quantity determined as a result of a number of tests. This quantity enables the capacitance values that are certainly and definitely indicative of the presence of beverage liquid in proximity of the electrode 4 on which such value has been measured, to be discriminated from the capacitance values that are representative of situations in which beverage liquid is not present in proximity of the electrode 4 owing to the side wall of the container 3 not being wetted by, or not being in contact with the beverage liquid, or owing to the side wall of the container 3—although wetted by or in contact with the beverage liquid contained therein—is spaced away from the electrode 4 or comes to only partially lie above said electrode due to the particular shape of the container 3.

In practice, the electrode 4, whose capacitance value—as measured by said circuit means 6—is in excess of said first threshold capacitance value, delivers a valid length signal for the container 3, thereby indicating that the side wall of the container 3 wetted by the beverage liquid is in contact with and occupies the area of inner surface 5 of the cavity 8 in which that given electrode 4 is residing.

The control means 7 process and weigh the signals delivered by each electrode 4 and, then, select—with reference to either ways of the axial direction 9 of the cavity 8—the first electrode and the last electrode that deliver a valid container length signal, the distance between these electrodes 4 representing the actual length of the container 3.

In other words, among all those electrodes 4 that deliver a valid length signal, the control means 7 select the two electrodes that lie farthest away from each other along the axial direction 9 of the cavity 8, wherein such distance between such two electrodes is assumed to be the length of the container.

The control means 7 are of course duly set as to be able to associate each electrode 4 to a given reference position inside the cavity of the receptacle, as well as to determine the distances between all electrodes 4 from each other, the distance between two adjacent electrodes 4 being in fact known.

In the case that the capacitance value measured on each electrode 4 does not exceed the above-cited first threshold capacitance value, and none of the electrodes 4 therefore delivers a valid length signal, the control means consider the cavity 8 of the receptacle 2 as being empty, i.e. not accommodating any container 3, or the receptacle 2 as accommodating an empty container of a non-conductive material therein, so that they will not activate the cooling means.

Introducing a container 3 of a non-conductive material, and containing beverage liquid therein, in the receptacle 2, and having such container resting upon the inner surface 5 thereof, is instrumental in changing—as this has been described hereinbefore—the capacitance value being measured on each electrode 4 or, possibly, on each, pair of electrodes, depending on the particular embodiment implemented, in accordance with the length of the container 3 wetted by the beverage liquid.

The capacitance value detected on each electrode 4 may furthermore deliver information about the material, which the container is made of, as this shall be described in greater detail below.

Figure 3:
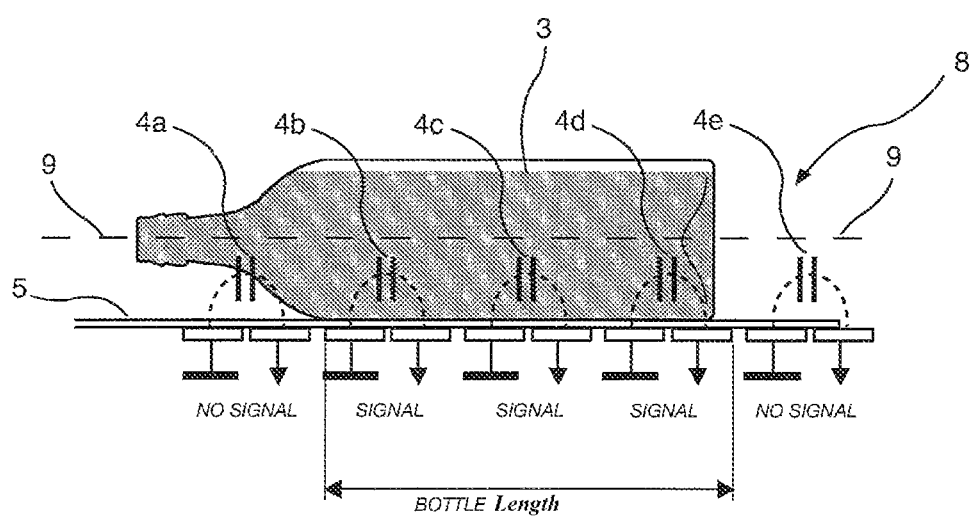
FIG. 3 is a side elevational, cross-sectional view of the rapid chilling apparatus according to the present invention, showing the receptacle and the electrodes in greater detail.

As this is best shown in FIG. 3, which illustrates a container of non-conductive material placed in the receptacle 2, the circuit means 6 measure on each one of the central electrodes 4b, 4c, 4d, in proximity of which beverage liquid is present, a capacitance value that is greater than the first threshold capacitance value and, as a result, deliver a valid length signal. Conversely, the capacitance value measured on the outermost electrodes 4a and 4e, which do not lie in proximity of the beverage liquid filled in the container, turns out as being lower than said first threshold capacitance value, so that these electrodes do not deliver any valid length signal.

Referring again to FIG. 3, the electrode 4a can be noticed to face a portion of the side wall of the container 3 that is wetted by, i.e. in contact with the liquid contained therein, wherein such liquid, however, does not lie in proximity of the electrode 4a since—owing to the particular shape of the container 3—the side wall of the latter is spaced away from and not in contact with the inner surface 5 of the receptacle 2 on which the electrode 4a is positioned.

These signals are not only indicative of the presence of a bottle in the receptacle of the chilling arrangement, and inform the control means 7 accordingly, but they also enable the length of the same bottle wetted by the beverage liquid to be worked out and determined.

Referring once again to FIG. 3, the control means select—among the three central electrodes 4b, 4c, 4d (three electrode pairs, in this particular case) delivering a valid length signal—the two electrodes that lie farthest away from each other along the axial direction 9 of the cavity 8, i.e. the electrode 4b and the electrode 4d in this case. The distance between these electrodes is then assumed as being the length of the container 3.

Usually, for instance, 1.5-liter bottles currently available on the market have substantially the same size and, in particular, the same length. The same applies also to other bottles, such as for instance 0.5-liter bottles. It is therefore possible for a detected length of the container introduced in the receptacle to be univocally associated to a volume of the contents thereof.

Thus, the control means 7 derive the length of the bottle, associate such length to a corresponding volumetric content thereof, and then activate the cooling means so as to cause the bottle, and the content thereof, to undergo rapid chilling.

Furthermore, the control means 7 are adapted to cut off the operation of the cooling means after a pre-determined period of time, whose length has been selected so as to prove adequate in enabling the bottle to be effectively cooled down depending on the thus detected length of the same bottle and, as a result, the volumetric contents thereof.

In this connection, it can be readily appreciated that equal and same cooling means will need a correspondingly longer time to be able to cool down a 1.5-liter bottle than a 0.5-liter one.

Of course, the same considerations as set forth above equally apply to carton-like beverage packages or the like.

As far as the cooling means themselves are concerned, they may for instance comprise a dedicated evaporator, in the case that the rapid chilling apparatus is constituted by a self-standing, i.e. autonomous unit that integrally comprises its own receptacle 2, circuit means 6, control means 7 and cooling means. Conversely, the rapid chilling apparatus may be integrated in a refrigerator, in which the receptacle thereof may for instance be cooled down by a flow of cooling air taken in from the evaporator area of the refrigerator.

Figure 5:
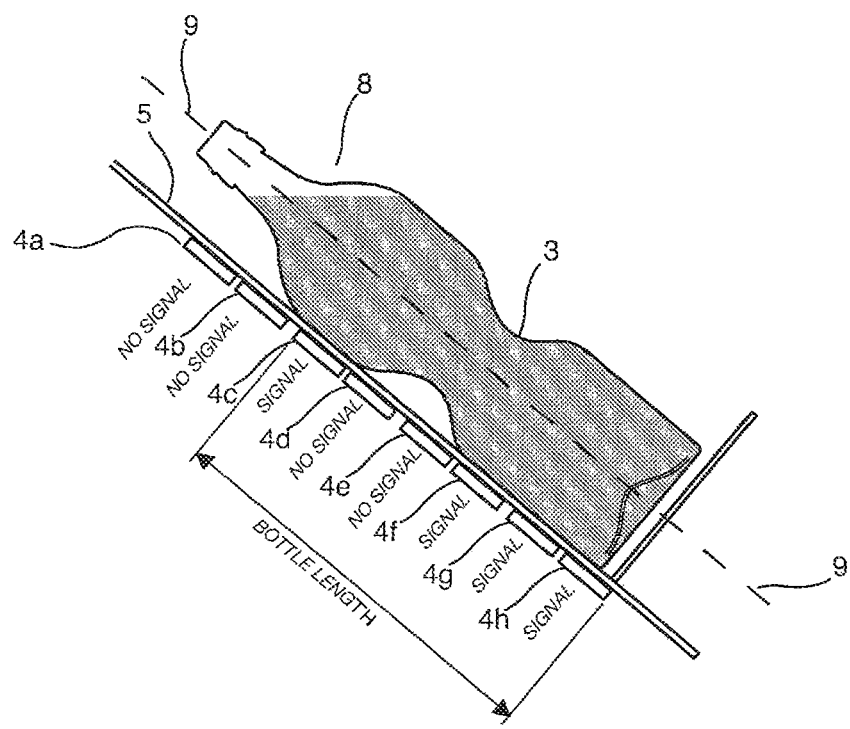
FIG. 5 is a side elevational, cross-sectional view of the rapid chilling apparatus according to a further embodiment of the present invention, showing the receptacle and the electrodes in greater detail.

Illustrated in FIG. 5 is a further embodiment of the inventive chilling apparatus, in which the cavity 8 of the receptacle 2, as well as the inner surface 5 thereof, are arranged so as to extend with an inclined orientation relative to the horizontal direction, and in which the circuit means 6 measure the capacitance value on each electrode 4. In the example being discussed here, in which a container of a non-conductive material is illustrated as being introduced in the receptacle 2, the circuit means 6 will therefore measure on each one of the electrodes 4c, 4f, 4g, 4h, in the proximity of which there lies beverage liquid, a capacitance value that is greater than the first threshold capacitance value and, as a result, deliver a valid length signal. Conversely, the capacitance value measured on the electrodes 4a, 4b, 4d, 4e, which do not lie in proximity of the beverage liquid held in the container, turns out as being lower than said first threshold capacitance value, so that these electrodes do not deliver any valid length signal.

Referring again to FIG. 5, the electrodes 4a, 4b, 4d and 4e are facing a portion of the side wall of the container that is wetted by, i.e. in contact with the beverage liquid contained therein, but do not deliver any valid length signal, since the beverage liquid itself does not lie in proximity of the above-mentioned electrodes, since—owing to the particular shape of the container 3—the side wall of the latter is spaced away from and not in contact with the inner surface 5 of the receptacle 2, on which the electrodes 4a, 4b, 4d and 4e are located.

Again with reference to FIG. 5, the control means select—among the electrodes 4c, 4f, 4g, 4h delivering a valid length signal—the two electrodes that lie farthest away from each other along the axial direction 9 of the cavity 8, i.e. the electrode 4c and the electrode 4h in this case. The distance between these electrodes is then assumed as being the length of the container 3.

Figure 6:
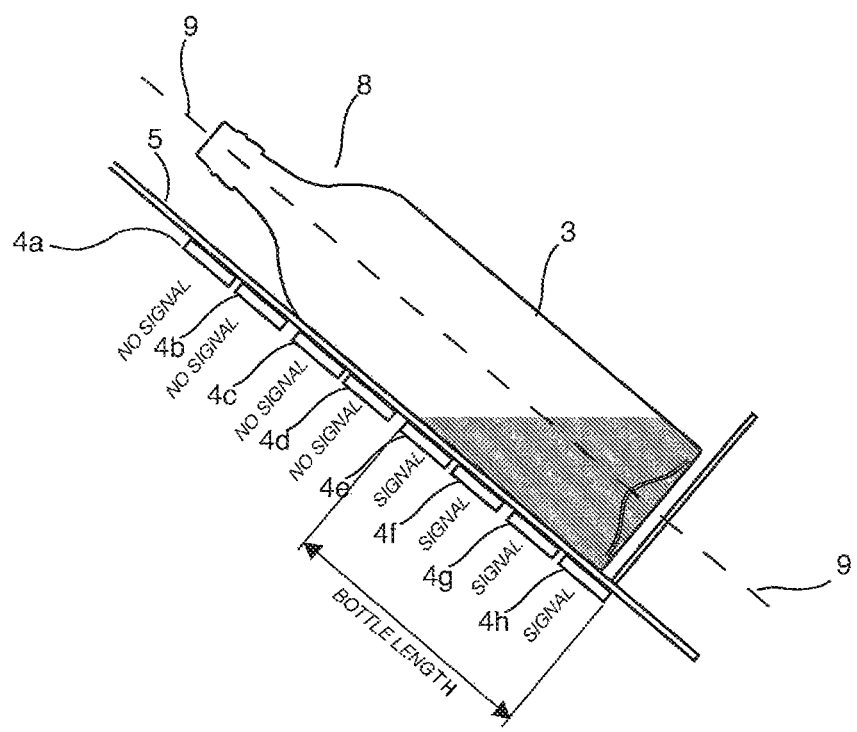
FIG. 6 is a view similar to the one appearing in FIG. 5.

Referring now to FIG. 6, which illustrates a container 3 of a non-conductive material inserted in the receptacle 6, on each one of the electrodes 4e, 4f, 4g, 4h lying in proximity of beverage liquid contained in said container the circuit means 6 measure a capacitance value that is greater than the first threshold capacitance value and, as a result, deliver a valid length signal. Conversely, the capacitance value measured on the electrodes 4a, 4b, 4d, 4e, which do not lie in proximity of the beverage liquid held in the container, turns out as being lower than said first threshold capacitance value, so that these electrodes do not deliver any valid length signal.

In FIG. 6, the electrodes 4c, 4d are shown facing a portion of the side wall of the container that, while being in contact with the inner surface 5 of the cavity 8, is not wetted by, i.e. not in contact with the beverage liquid contained in said container. Therefore, since the liquid does not lie in proximity of said electrodes 4c, 4d, these do not deliver any valid length signal.

Referring again to FIG. 6, the control means select—among the electrodes 4e, 4f, 4g, 4h delivering a valid length signal—the two electrodes that lie farthest away from each other along the axial direction 9 of the cavity 8, i.e. the electrode 4e and the electrode 4h in this case. The distance between these electrodes is then assumed as being the length of the container 3.

As it clearly appears from the example illustrated in FIG. 6, in the case of containers 3 that are made of a non-conductive material, the apparatus according to the present invention is capable of operating the cooling means for a length of time that depends on the actual length of the container 3 as determined by the residual liquid content thereof, i.e. by the actual amount of beverage still held in the same container.

Again in the case of containers 3 made of a non-conductive material, the control means 7 are adapted to compare the capacitance values measured on the electrodes 4 delivering a valid length signal with a value that is representative of sold ice forming inside the container 3. When the beverage in the container freezes down to solid ice, the capacitance value measured on the sensors exceeds the first threshold capacitance value, but is lower as an absolute value than the value that is detected in the condition in which the beverage in the container is in the liquid state thereof. The control means 7 are therefore adapted to switch off cooling operation as soon as they sense that the liquid beverage inside the container 3 has undergone a phase transition to solid ice.

Further, it has been found that, in the case of containers 3 made of a non-conductive material, the capacitance value measured on the electrodes 4 delivering a valid length signal varies in accordance with the amount of liquid still present inside the container 3. When the container is totally filled, the capacitance value detected on the electrodes is greater than the value that is measured when the same container is just half-filled, this being attributable to the fact that the differing liquid layer that comes to lie above the electrodes in these two cases, is most obviously effective in determining different conditions of electric conductivity.

The control means are adapted to compare the capacitance values measured on the electrodes delivering a valid length signal with corresponding reference values, so as to determine the amount of beverage liquid contained in the container, whose length has been determined as explained above. This can be applied not only to the embodiment illustrated in FIG. 3, in which the receptacle 2 and the inner surface 5, along with the containers inserted therein, lie in a horizontal position, but also to the embodiments illustrated in FIGS. 5 and 6.

In the case of a container made of a conductive material, such as for instance an aluminium can, the capacitance value detected by the circuit means 6 on each electrode 4 is solely determined by the presence of the side wall of the container in proximity of the same electrode, regardless of the container itself holding liquid or not.

Each electrode 4 lying close to the side wall of the container made of electrically conductive material forms with the latter a kind of capacitor, owing exactly to the high electrical conductivity property of the material which the container is made of.

Those electrodes 4 that are positioned in the zone where the side wall of the container 3 is in contact with the inner surface 5, i.e. the electrodes that lie under, i.e. facing the zone where the side wall of the container is in contact with said inner surface, deliver a high capacitance value. Those electrodes 4 that on the contrary lie in a zone of the inner surface 5, in which the latter is not in contact with the side wall of the container 3, deliver a capacitance value that is determined by air acting as the dielectric and, as a result, is extremely low, as described in the previously considered case of containers made of non-conductive material.

The capacitance value measured on each electrode 4 is greater in the situation in which the side wall of the container 3 is in contact with the whole area of the inner surface 5 of the cavity 8 where an electrode 4 lies. Conversely, in those situations in which the side wall of the container 3 only partially in contact, or does not come into any contact at all, with the area of the inner surface 5 lying above an electrode 4, the capacitance value detected on such electrode will be considerably lower and substantially comparable to the one brought about by only air being the actual dielectric in the receptacle.

Low capacitance values may also indicate those electrodes 4 that come to lie close to narrower or recessed portions of the container 3, or tapering portions that do not come into contact with the inner surface 5 of the cavity 8.

The capacitance value measured on the electrodes 4 that are located in the zone in which the inner surface 5 is in contact with the container of conductive material placed in the receptacle, is not only clearly greater than the first reference threshold value, but also significantly greater than the capacitance value detected on each electrode in the case of a container made of a non-conductive material.

The control means 7 are adapted to consider a second threshold capacitance value that represents a kind of material detection level, beyond which the container in the receptacle may be assumed to be made of metal and, as a result, to be for instance a can.

Owing to them being able to rely on a greater heat conductivity than glass or plastic bottles, cans and containers made of electrically conductive material in general allow for a much quicker cooling effect for a same volumetric content. Since 0.5-liter bottles have a same length as 0.5-liter cans, it clearly appears that being able to discriminate between these two types of containers is of great practical importance, in view of optimizing the cooling time by activating the cooling means for different lengths of time depending on the material which the container is made of.

Figure 4:
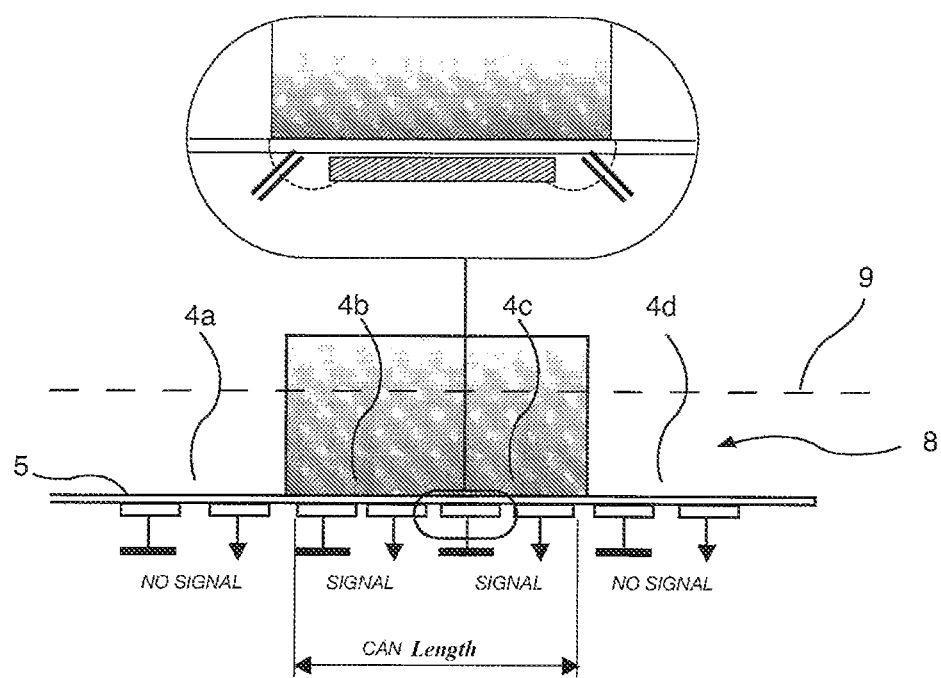
FIG. 4 is a view similar to the one appearing in FIG. 3.

As best shown in FIG. 4, on each one of the central electrodes 4b, 4c, which are positioned in the zone where the can is in contact with the inner surface 5, the circuit means measure a capacitance value that is greater than the first threshold value and greater than the second threshold value. Each one of such electrodes 4b, 4c therefore delivers a valid length signal and, at the same time, indicates that the container is a can. On the contrary, the outermost electrodes 4a, 4d, which are not facing the contact zone between the inner surface and the can, have a capacitance value that is lower than the first threshold value and, therefore, do not deliver any valid length signal.

The length of a can is determined in the same way as the length of a bottle.

Cans have standard sizes in accordance with the volumetric content thereof. In other words, all 0.33-liter cans have the same length, and the same applies also to all 0.25-liter and 0.5-liter cans, respectively. It is therefore possible for the detected length of a can to be univocally associated to a volume of the contents thereof.

Based on the values measured by the circuit means 6, the control means 7 derive the length of the container, establish that the container itself is made of metal and, therefore, is a can, associate such length to a corresponding volumetric content, and then activate the cooling means in view of having the can rapidly chilled along with the contents thereof. In other words, said cooling means carry out a cooling cycle that depends on the length of the container and, therefore, the volumetric content thereof, as well as the material—i.e. metal in the case of a can—which the container is made of.

The invention claimed is:

1. Rapid chilling apparatus for beverages comprising a receptacle adapted to accommodate beverage containers of differing length, and cooling means adapted to cool down said receptacle, wherein said receptacle has an inner surface, a portion of said inner surface extending along a direction that is parallel to the axial direction of the receptacle and being adapted to support a beverage container resting thereupon with a beverage container longitudinal axis that is parallel to said axial direction of the receptacle, and wherein said receptacle comprises a plurality of electrodes arranged in succession one after the other along said portion of the inner surface along said direction that is parallel to the axial direction of the receptacle, said electrodes being mounted sequentially in a manner so that a length of each electrode is transverse to the longitudinal axis of the beverage container, whereby said electrodes are distributed along the whole length of the beverage container, wherein said portion of the inner surface is concave and each of said electrodes is bent so as to form an annular member associated to the portion of the inner surface being concave, said electrodes being connected to circuit means adapted to detect and measure the capacitance value on each electrode as brought about by the presence of a beverage container made of an electrically conductive material in proximity of the same electrode so as to determine the actual length of the beverage container, or, in the case of a beverage container made of a non-electrically conductive material, said capacitance value as brought about by the presence, inside the beverage container, of beverage liquid in proximity of the same electrode, so as to determine the actual length of the beverage container being wetted by the beverage liquid contained thereinside, control means being provided to operate said cooling means in response to the capacitance values detected by said circuit means for a period of time, the duration of which is made dependent on the so determined length of the beverage container.

2. Apparatus according to claim 1, wherein said control means are adapted to compare said capacitance values with a pre-defined value in order to determine whether the beverage container is made of a conductive material, the duration of said operating time of the cooling means depending on the material which the beverage container is made of.

3. Apparatus according to claim 1, wherein the control means, in the case of beverage containers made of a non-conductive material, are adapted to compare the capacitance values measured on the electrodes with corresponding reference values so as to determine the amount of beverage liquid still present inside the beverage container.

4. Apparatus according to claim 1, wherein said electrodes are associated to the inner surface of the receptacle and arranged in succession one after the other along the axial direction, said inner surface being adapted to support said beverage container.

5. Apparatus according to claim 4, wherein said electrodes are applied onto said inner surface of the receptacle and a protective layer is applied to cover said electrodes.

6. Apparatus according to claim 4, wherein said electrodes are integrated or embedded within the thickness of the wall of the receptacle, so as to be positioned in proximity of the inner surface of the receptacle.

7. Apparatus according to claim 1, wherein said circuit means comprise an oscillatory circuit.

8. Apparatus according to claim 1, wherein said control means are adapted to compare the capacitance values measured on each electrode with a first pre-determined threshold capacitance value representing a length reference level, which is used to discriminate whether the electrode is delivering a valid length signal for the beverage container or does not deliver any length signal at all.

9. Apparatus according to claim 8, wherein the control means are adapted to infer that no beverage container is present in the receptacle and, furthermore, in the case of a beverage container made of a non-conductive material, that the beverage container introduced in the receptacle is empty and, as a result, do not activate the cooling means, when the capacitance value measured on each electrode does not exceed the first threshold capacitance value and, therefore, none of the electrodes delivers a valid length signal.

10. Apparatus according to claim 8, wherein the electrode, whose capacitance value is in excess of said first threshold capacitance value, delivers a valid length signal for the beverage container by indicating that lying in proximity of said electrode there is the side wall of a beverage container of a conductive material, and, in case of a beverage container made of a non-conductive material, by indicating that lying in proximity of said electrode there is the side wall of the beverage container being wetted by the beverage liquid contained therein, and wherein the electrode, whose capacitance value is lower than said first threshold capacitance value, does not deliver any valid length signal for the beverage container by indicating that the side wall of the beverage container is spaced away from the electrode and, furthermore, in the case of a beverage container made of a non-conductive material, that the side wall of the beverage container, although lying in proximity of the electrode, is not wetted by the beverage liquid inside the beverage container.

11. Apparatus according to claim 1, wherein the control means are adapted to select, among all electrodes delivering a valid length signal, the two electrodes that lie farthest away from each other along said axial direction, said control means being adapted to assume such distance between these two electrodes as being the length of the beverage container.

12. Apparatus according to claim 1, wherein the control means are adapted to compare the capacitance value measured on each electrode with a second threshold capacitance value, which is higher than the first threshold capacitance value and represents a reference material-identification level, beyond which the beverage container is assumed to be made of an electrically conductive material.

13. Apparatus according to claim 1, wherein the control means, on the basis of the values measured on the electrodes, are adapted to derive the length of the beverage container, associate such length to a corresponding volumetric content of the same beverage container, establish whether the beverage container itself is made of a conductive material and then activate the cooling means to operate in accordance with the so detected volumetric content and material of the beverage container.

14. Apparatus according to claim 1, wherein the control means, in the case of beverage containers made of a non-conductive material, are adapted to compare the capacitance values measured on the electrodes delivering a valid length signal with a value that is representative of solid ice forming inside the beverage container, said control means being thus adapted to switch off cooling as soon as they sense that the liquid beverage inside the beverage container has undergone a phase transition to solid ice.

15. Method for controlling a rapid chilling apparatus for beverages comprising a receptacle adapted to accommodate beverage containers of differing length, of the bottle, can, carton or similar type, and cooling means adapted to cool down said receptacle, characterized in that it comprises the steps of:
providing a plurality of electrodes arranged in succession one after the other along an inner surface of said receptacle along a direction that is parallel to the axial direction of the receptacle, a portion of said inner surface extending along a direction that is parallel to the axial direction of the receptacle and being adapted to support a beverage container resting thereupon with a beverage container longitudinal axis that is parallel to said axial direction of the receptacle, said electrodes being mounted sequentially in a manner so that a length of each electrode is transverse to the longitudinal axis of the beverage container, so that said electrodes are distributed over the whole length of the beverage container along said portion of the inner surface wherein said portion of the inner surface is concave and each of said electrodes is bent so as to form an annular member associated to the portion of the inner surface being concave;
detecting and measuring the capacitance value on each electrode brought about by the presence in the receptacle of the beverage container made of an electrically conductive material in proximity of the same electrode, so as to determine the length of the said beverage container, or in the case of a beverage container made of a non-electrically conductive material being introduced in said receptacle, as brought about by the presence of beverage liquid in proximity of the same electrode, so as to determine the actual length of the beverage container being wetted by the beverage liquid contained thereinside; and
operating cooling means, in response to the detected capacitance values, for a period of time whose duration depends on the so determined length of the beverage container.

16. Rapid chilling method for beverages according to claim 15, further comprising the steps of:
comparing said capacitance values with a pre-established value to determine whether the beverage container is of electrically conductive material; and
operating said cooling means in response to the detected capacitance values for a period of time, whose duration depends on the material which the beverage container is made of.

* * * * *

UNITED STATES PATENT AND TRADEMARK OFFICE
CERTIFICATE OF CORRECTION

PATENT NO. : 8,453,472 B2
APPLICATION NO. : 12/093007
DATED : June 4, 2013
INVENTOR(S) : Pimputkar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 452 days.

Signed and Sealed this
Eighth Day of September, 2015

Michelle K. Lee
*Director of the United States Patent and Trademark Office*